US010778460B1

(12) United States Patent
Khan et al.

(10) Patent No.: US 10,778,460 B1
(45) Date of Patent: Sep. 15, 2020

(54) SYSTEMS AND METHODS FOR CONFIGURING AND CONTROLLING DISTRIBUTED CLIMATE CONTROL DEVICES

(71) Applicant: Johnson Controls Technology Company, Auburn Hills, MI (US)

(72) Inventors: Abu Bakr Khan, Franklin, WI (US); Hunter R. Hobgood, Franklin, WI (US); Dinesh Trikha, Shorewood, WI (US); Aasir Rasheed, Gaya (IN); Saivaishnavi S, Tamil Nadu (IN)

(73) Assignee: Johnson Controls Technology Company, Auburn Hill, MI (US)

(*) Notice: Subject to any disclaimer, the term of this patent is extended or adjusted under 35 U.S.C. 154(b) by 0 days.

(21) Appl. No.: 16/401,567

(22) Filed: May 2, 2019

(51) Int. Cl.
| | |
|---|---|
| *H04L 12/28* | (2006.01) |
| *H04L 29/08* | (2006.01) |
| *F24F 11/88* | (2018.01) |

(52) U.S. Cl.
CPC .......... *H04L 12/2807* (2013.01); *F24F 11/88* (2018.01); *H04L 67/10* (2013.01); *H04L 67/125* (2013.01); *H04L 2012/2841* (2013.01)

(58) Field of Classification Search
CPC ... H04L 12/2807; H04L 67/10; H04L 67/125; H04L 2012/2841; F24F 11/88
See application file for complete search history.

(56) References Cited

U.S. PATENT DOCUMENTS

| | | | | |
|---|---|---|---|---|
| 10,430,710 | B2* | 10/2019 | Mintz | G06N 5/022 |
| 2010/0102983 | A1* | 4/2010 | Plocher | G08B 25/012 340/691.6 |
| 2013/0250638 | A1* | 9/2013 | Tuttle | H02M 7/06 363/126 |
| 2015/0156631 | A1* | 6/2015 | Ramachandran | H04W 12/06 455/411 |
| 2019/0248193 | A1* | 8/2019 | Scheibenzuber | B60C 23/0442 |

FOREIGN PATENT DOCUMENTS

CN 104113772 A * 10/2014 ....... H04N 21/25891

* cited by examiner

*Primary Examiner* — Michael A Keller
(74) *Attorney, Agent, or Firm* — Foley & Lardner LLP

(57) ABSTRACT

Disclosed is a system to enable operating parameters of edge devices to be configured. In one example, a controller device detects or verifies edge devices that are powered-off. In response to detecting edge devices, the controller device generates, for each detected edge device, corresponding configuration data, and transmits the configuration data to the server. In one approach, each powered-on edge device connects to the server, and automatically retrieves corresponding configuration data from the server. In another example, a disclosed controller device enables configuring operating parameters of edge devices without a network connection to the server through a simplified process. For example, the controller device detects or verifies edge devices within a predetermined distance from the controller device. The controller device may simultaneously or sequentially access different wireless communications with different edge devices using network access information, and transmit configuration data to connected edge devices.

20 Claims, 13 Drawing Sheets

SYSTEMS AND METHODS FOR CONFIGURING AND CONTROLLING DISTRIBUTED CLIMATE CONTROL DEVICES

BACKGROUND

The present disclosure relates generally to control systems for a heating, venting, and air conditioning (HVAC) system. More particularly, the present disclosure relates to configuring distributed devices of the HVAC system.

An HVAC system can be used to control the climate of a space (e.g., in a building). For example, an HVAC system may allow a temperature, pressure, humidity, or a combination of them in a room to be controlled. In some implementation, an HVAC system includes numerous components (also referred to as "HVAC devices" or "edge devices" herein) such as water plants, heater plants, chillers, pumps, dampers, actuators, valves, sensors for adjusting a temperature, pressure, humidity, etc. that operate together to control the climate. These devices may be distributed at different places according to a floor plan of the space or operating efficiency of controlling the climate.

Often, configuring the components of the HVAC system involves an inefficient and laborious process. For example, a field engineer may physically approach to different components of the HVAC system located at different places, and individually configure the components. For a large building, manually configuring hundreds of components may take several hours or days. Thus, resetting, reconfiguring, or updating configuration of a subset or all components of the HVAC system may be delayed.

SUMMARY

Various embodiments of the present disclosure relate to a controller device. In some embodiments, the controller device includes a device detector to detect one or more edge devices of a central plant. In some embodiments, the controller device includes a server communication interface coupled to the device detector, where the server communication interface is configured to communicate with a remote server. In some embodiments, the controller device includes a processor coupled to the device detector and the server communication interface. In some embodiments, the processor is configured to obtain an identification of an edge device detected by the device detector. In some embodiments, the processor is configured to generate configuration data of the edge device based on the identification of the edge device, where the configuration data indicates one or more operating parameters of the edge device for climate control of the central plant. In some embodiments, the processor is configured to transmit the configuration data to the remote server through the server communication interface. In some embodiments, the edge device is configured to retrieve the configuration data of the edge device from the remote server, and operate according to the one or more operating parameters of the configuration data for the climate control.

In some embodiments, the processor is configured to generate the configuration data in response to determining that the edge device is powered-off.

In some embodiments, the edge device is configured to retrieve the configuration data of the edge device from the remote server, in response to the edge device being powered-on from a powered-off state.

In some embodiments, the processor is configured to obtain another identification of another edge device from the device detector, generate additional configuration data of the other edge device based on the other identification of the other edge device, the additional configuration data indicating one or more operating parameters of the other edge device for the climate control of the central plant, and transmit the additional configuration data of the other edge device to the remote server through the server communication interface.

In some embodiments, the processor is configured to transmit the configuration data of the edge device with the additional configuration data of the other edge device to the remote server through the server communication interface.

In some embodiments, the processor is configured to generate a user interface allowing a user of the controller device to modify an operating parameter of the one or more operating parameters, and generate the configuration data according to the modified operating parameter.

In some embodiments, the processor is configured to authenticate the user of the controller device through the user interface, and allow the user to modify the operating parameter in response to an authentication by the user.

In some embodiments, the device detector includes an optical code detector, the optical code detector to detect the identification of the edge device based on an image data including an optical code of the edge device.

In some embodiments, the controller device further includes a device communication interface coupled to the processor, the device communication interface to detect the identification of the edge device based on a wireless communication with the edge device through the device communication interface.

Various embodiments of the present disclosure relate to a controller device. In some embodiments, the controller device includes a device detector to detect edge devices within a predetermined distance from a plurality of edge devices of a central plant. In some embodiments, the controller device includes a device communication interface coupled to the device detector, where the device communication interface is configured to communicate with the detected edge devices. In some embodiments, the controller device includes a processor coupled to the device detector and the device communication interface. In some embodiments, the processor is configured to obtain identifications of detected edge devices. In some embodiments, the processor is configured to obtain, for each of the detected edge devices, corresponding network access information based on a corresponding identification, each of the detected edge devices providing a corresponding wireless network accessible with the corresponding network access information. In some embodiments, the processor is configured to obtain, for each of the detected edge devices, corresponding configuration data based on a corresponding identification, the corresponding configuration data indicating one or more operating parameters of the each of the detected edge devices for climate control of the central plant. In some embodiments, the processor is configured to transmit, to each of the detected edge devices, the corresponding configuration data through the corresponding wireless network based on the corresponding network access information.

In some embodiments, the processor is further configured to generate a user interface allowing a user of the controller device to authenticate and generate a single instruction according to an authentication by the user. In some embodiments, the processor is configured to transmit, to each of the detected edge devices, the corresponding configuration data, in response to the single instruction.

In some embodiments, the device communication interface is configured to sequentially connect to wireless networks provided by the detected edge devices, in response to the single instruction. In some embodiments, the processor is configured to transmit, to each of the detected edge devices, the corresponding configuration data, while the device communication interface is connected to the wireless network provided by the each of the detected edge devices.

In some embodiments, the device communication interface is configured to simultaneously connect to wireless networks provided by two or more of the detected edge devices, in response to the single instruction. In some embodiments, the processor is configured to simultaneously transmit, to each of the two or more of the detected edge devices, the corresponding configuration data, while the device communication interface is connected to the wireless networks provided by the two or more of the detected edge devices.

In some embodiments, the controller device further includes a server communication interface coupled to the device detector, the server communication interface to communicate with a remote server, and a local storage coupled to the processor. In some embodiments, the processor is configured to obtain, for each of the plurality of edge devices, corresponding configuration data from the remote server through the server communication interface, and store, for each of the plurality of edge devices, the corresponding configuration data at the local storage prior to obtaining the identifications of the detected edge devices.

In some embodiments, the processor is configured to obtain, for each of the detected edge devices, the corresponding configuration data from the local storage based on the corresponding identification.

In some embodiments, the device detector includes an optical code detector, the optical code detector to detect the identifications of the detected edge devices based on image data including optical codes of the detected edge devices.

In some embodiments, the device communication interface is configured to detect the identifications of the detected edge devices based on secondary wireless connections with the detected edge devices through the device communication interface.

In some embodiments, the wireless network provided by an edge device is a direct point to point network between the controller device and the edge device.

Various embodiments of the present disclosure relate to an edge device. In some embodiments, the edge device includes a controller communication interface to provide a wireless network accessible by network access information, and detect a controller device accessing the wireless network with the network access information. In some embodiments, the edge device includes a processor coupled to the controller communication interface. In some embodiments, the processor is configured to retrieve, from the controller device through the controller communication interface, configuration data indicating one or more operating parameters of the edge device for climate control of the central plant, in response to a connection with the controller device through the wireless network, and operate according to the one or more operating parameters of the configuration data for the climate control.

In some embodiments, the wireless network provided by the edge device is a direct point to point network between the controller device and the edge device.

DETAILED DESCRIPTION

Overview

Figure 1:
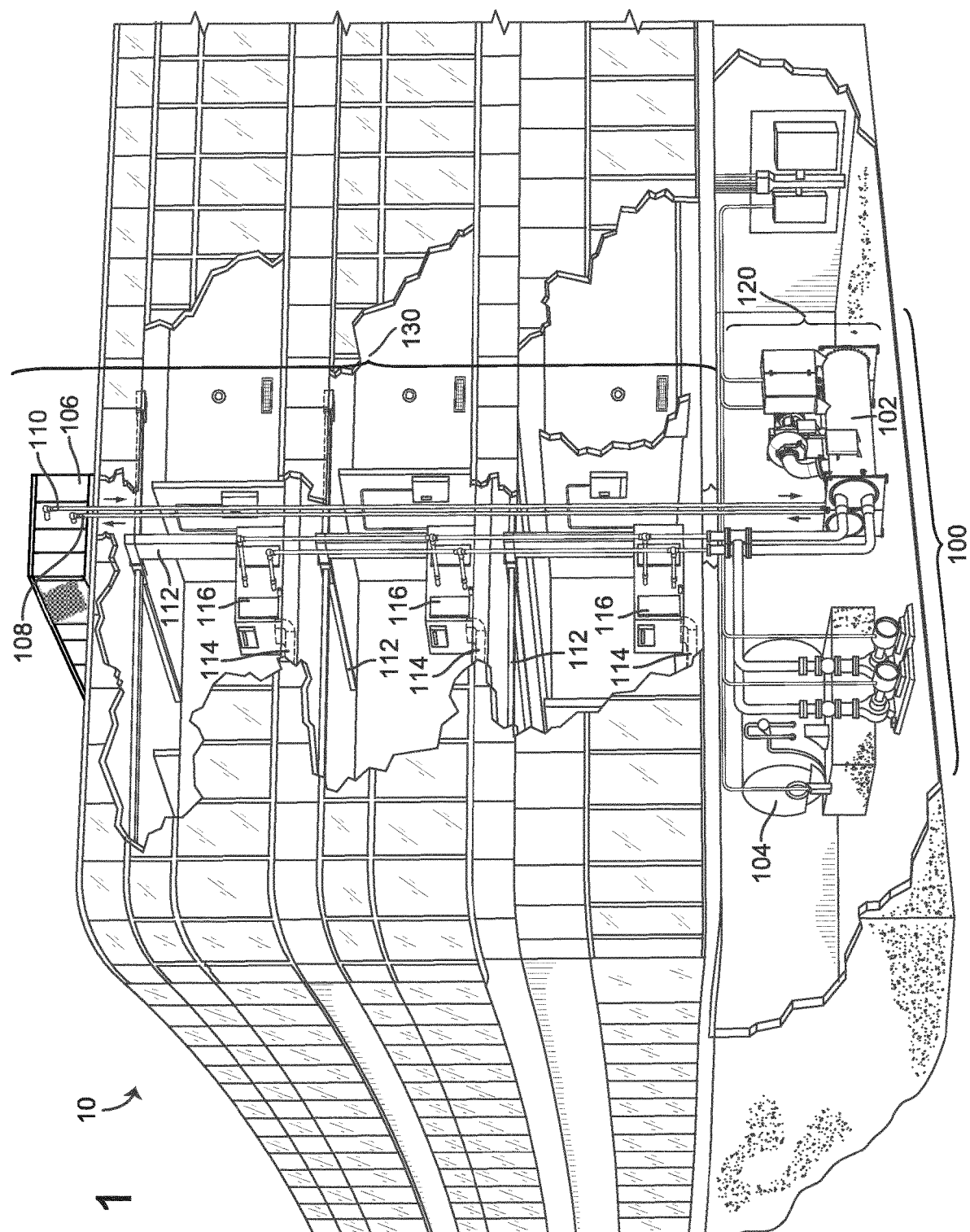
FIG. 1 is a drawing of a building equipped with an HVAC system, according to some embodiments.

Referring generally to the FIGURES, systems and methods for controlling a HVAC system. More particularly, the present disclosure relates to configuring distributed devices of the HVAC system by a portable device.

In some embodiments, a disclosed system herein includes a controller device, a server, and edge devices. Edge devices are various HVAC devices deployed at various places within a building. A server (also referred to as "a central computing device") generates and stores configuration data specifying one or more parameters of the edge devices for climate control. A controller device is a portable device (e.g., smart phone, tablet computer, or any portable electronic computer) that allows or helps configuration of the edge devices with the configuration data. In one aspect, a field engineer of the HVAC system carries the controller device, and configures the edge devices using the controller device.

In some embodiments, a disclosed controller device enables operating parameters of edge devices to be pre-configured. For example, the controller device detects or verifies edge devices that are disabled or powered-off. In response to detecting edge devices, the controller device generates or modifies, for each detected edge device, corresponding configuration data, and transmits the configuration data to the server. When the edge devices are enabled or powered-on, each enabled or powered-on edge device connects to the server, and automatically retrieves corresponding configuration data from the server. Hence, the controller device can pre-configure edge devices even when the edge devices are disabled or turned off, without waiting for each edge device to be enabled or powered-on.

In some embodiments, a disclosed controller device enables configuring operating parameters of edge devices without a network connection to the server through a simplified process. For example, the controller device detects or verifies edge devices within a predetermined distance from the controller device. In response to detecting edge devices, the controller device may generate or modify, for each detected edge device, corresponding configuration data and obtain corresponding network access information for establishing a wireless communication with the each detected edge device. In one aspect, each edge device provides a wireless network accessible by corresponding network access information. The controller device may simultaneously or sequentially access different wireless communications with different edge devices using corresponding network access information, and transmit configuration data to connected edge devices. In some embodiments, the controller device generates a user interface allowing a user to authenticate and generate a single instruction. In response to the single instruction, the controller device may automatically connect to multiple edge devices within the predetermined distance through wireless networks hosted by the edge devices and transmit configuration data through the wireless networks. Hence, the controller device may configure multiple edge devices within the predetermined distance through a seamless process.

Building and HVAC System

Figure 2:
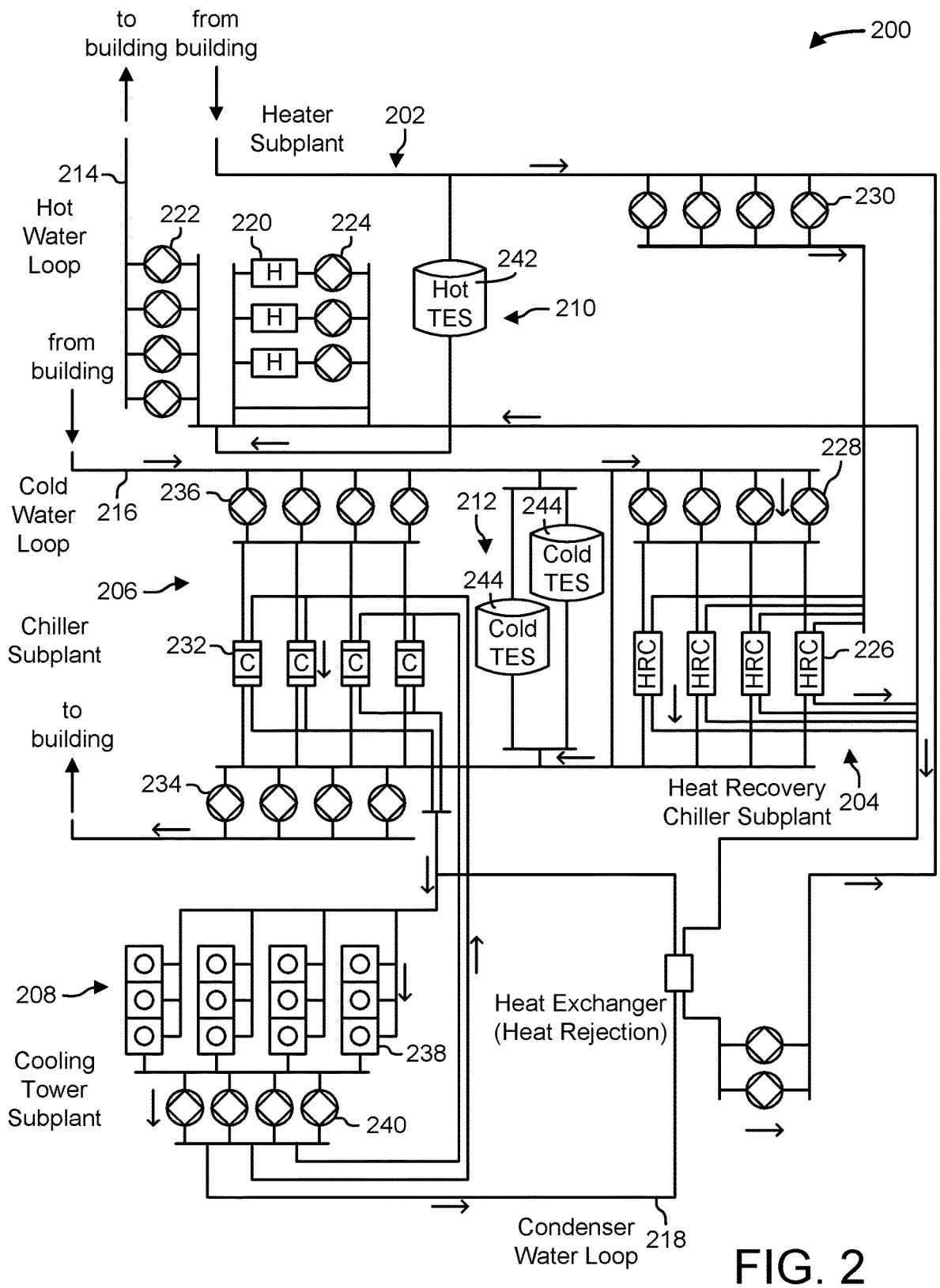
FIG. 2 is a schematic of a waterside system, which can be used as part of the HVAC system of FIG. 1, according to some embodiments.
Figure 3:
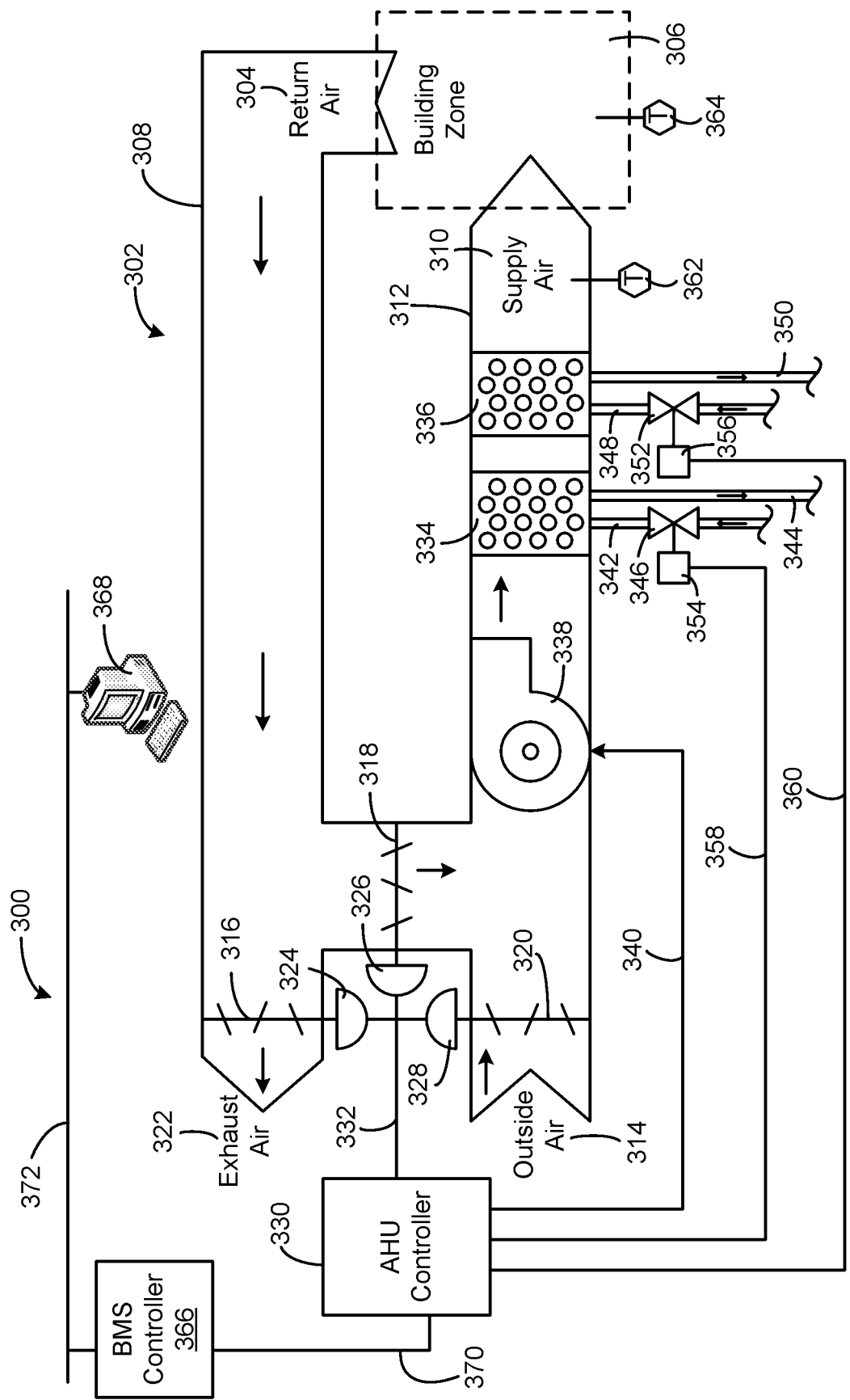
FIG. 3 is a block diagram illustrating an airside system, which can be used as part of the HVAC system of FIG. 1, according to some embodiments.

Referring now to FIGS. 1-3, an exemplary HVAC system in which the systems and methods of the present disclosure can be implemented are shown, according to an exemplary embodiment. While the systems and methods of the present disclosure are described primarily in the context of a building HVAC system, it should be understood that the control strategies described herein may be generally applicable to any type of control system.

Referring particularly to FIG. 1, a perspective view of a building 10 is shown. Building 10 is served by a building management system (BMS). A BMS is, in general, a system of devices configured to control, monitor, and manage equipment in or around a building or building area. A BMS can include, for example, an HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve set-point conditions for the building zone.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 and the building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment's configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive return air 304 and outside air 314. AHU 302 can be configured to operate an exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust air damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to AHU controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a set-point temperature for supply air 310 or to maintain the temperature of supply air 310 within a set-point temperature range). The positions of valves 346 and 352 affect the amount of heating or cooling provided to supply air 310 by heating coil 336 or cooling coil 334 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination thereof.

Still referring to FIG. 3, airside system 300 is shown to include a BMS controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. The AHU controller 330 may be a hardware module, a software module configured for execution by a processor of BMS controller 366, or both.

In some embodiments, AHU controller 330 receives information (e.g., commands, set points, operating boundaries, etc.) from BMS controller 366 and provides information (e.g., temperature measurements, valve or actuator positions, operating statuses, diagnostics, etc.) to BMS controller 366. For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Example Climate Control System

Figure 4:
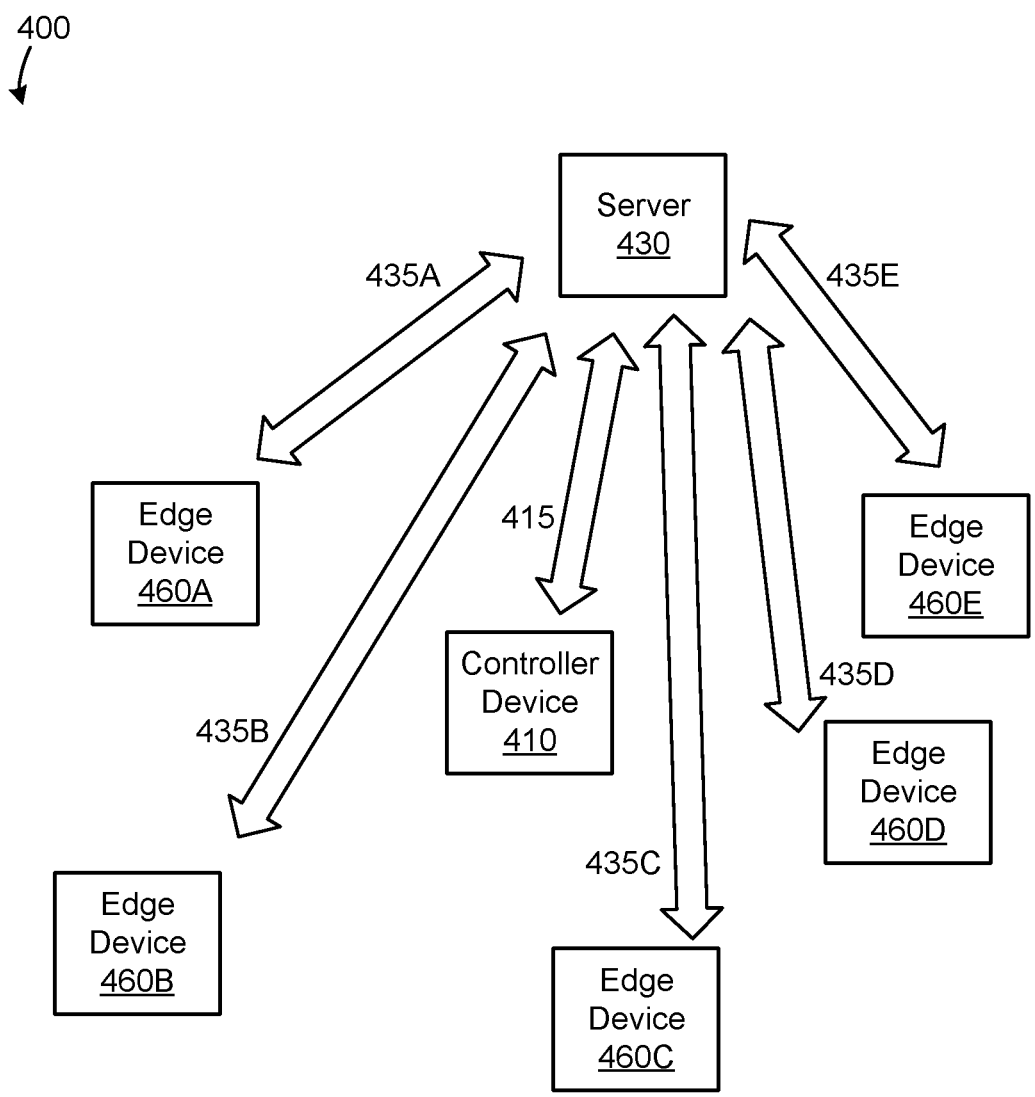
FIG. 4 is a block diagram of an HVAC system illustrating communication among different components of the HVAC system of FIG. 1, according to some embodiments.

FIG. 4 is a block diagram of an HVAC system 400 illustrating communication among different components of the HVAC system, according to some embodiments. In some embodiments, the HVAC system 400 is implemented as the HVAC system 100 of FIG. 1. In some embodiments, the HVAC system 400 includes a controller device 410, edge devices 460A, 460B . . . 460E (referred to as "an edge device 460" herein), and a server 430 (also referred to as "a remote server 430" or "a server computing device 430" herein). These components operate together to control climate of a space, for example, within a building. In other embodiments, the HVAC system 400 includes more, fewer, or different components than shown in FIG. 4. For example, the HVAC system 400 may include a different number of edge devices 460 than shown in FIG. 4.

The edge device 460 is a HVAC device to perform a climate control. In some embodiments, the edge device 460 is any of water plant, heater plant, chiller, pump, damper, actuator, valve, sensor, etc., as described above with respect to FIGS. 1 through 3. In one aspect, the edge device 460 operates according to configuration data specifying one or more operating parameters of the edge device 460. For example, configuration data of a chiller specifies a target capacity, inlet flow rate, outlet flow rate, inlet temperature, and outlet temperature of the chiller. In some embodiments, the edge device 460 communicates with the controller device 410, the server 430 or other edge devices 460 to request or obtain configuration data. Based on operating parameters specified by the configuration data, the edge device 460 operates to perform climate control. Different edge devices 460 may operate according to different configuration data. In some embodiments, the edge device 460 obtains measurements of values (e.g., measured temperature, pressure, humidity, etc.) through sensors and provides the measured values to the server 430, the controller device 410, or other edge devices 460. Detailed implementations and operations of the edge device 460 are provided below with respect to FIGS. 7, 9 and 10.

The server 430 is a hardware component that generates and stores configuration data. In some embodiments, the server 430 is implemented as the BMS controller 366, the AHU controller 330, the client device 368 of FIG. 3, or any combination of them. In some embodiments, the server 430 generates and stores different configuration data for different edge devices 460. In some embodiments, the server 430 is implemented on a cloud storage. In one aspect, the server 430 receives set points for target climate (e.g., target temperature, pressure, humidity, etc.,) and determines operating parameters for configuring various edge devices 460 to obtain the set points. The server 430 may obtain measured values of the edge devices, and determine or modify the operating parameters of the edge devices 460 according to the measured values. In one aspect, the server 430 stores default set points or default operating parameters, in case no particular set points are obtained or in case operating parameters cannot be obtained. The server 430 may receive a request for configuration data for one or more edge devices 460 from the controller device 410, the one or more edge devices 460, or a combination of them. In response to the request, the server 430 may transmit configuration data to the requesting devices. Moreover, the server 430 may receive updated configuration data from the controller device 410 or the edge devices 460, and store the received configuration data. Detailed implementations and operations of the server 430 are provided below with respect to FIGS. 8 through 10.

The controller device 410 is a hardware component that detects nearby edge devices 460 and configures the edge devices 460 with configuration data. In some embodiments, the controller device 410 is implemented as a smart phone, a tablet computer or any portable computing device. A field engineer may carry and operate the controller device 410. The controller device 410 may obtain configuration data of edge devices 460, for example, from the server 430, and stores the obtained configuration data. The controller device 410 may present a user interface allowing a user (e.g., field engineer) operating the controller device 410 to modify the configuration data. The controller device 410 may detect nearby edge devices 460, and provide configuration data to the detected edge devices 460 or to the server 430. Detailed implementations and operations of the controller device 410 are provided below with respect to FIGS. 6, 9 and 10.

In one configuration, the controller device 410 preconfigures operating parameters of edge devices 460. For example, the controller device 410 detects or verifies edge devices 460 that are disabled or powered-off. In one approach, a field engineer may capture an image including an optical code (e.g., a QR code, a bar code, a serial number, etc.) of the edge device 460, and the controller device 410 may decode the optical code to detect the edge device 460. Additionally or alternatively, a field engineer may place the controller device 410 near (e.g., within 5 inch) the edge device 460, and the controller device 410 may detect the edge device 460 through a short range communication (e.g., near field communication, Bluetooth Low Energy communication, etc.). After detecting the edge devices 460, the controller device 410 generates a list of detected edge devices 460, and forwards the list to the server 430 through a connection 415 (e.g., wired, WLAN or cellular connection). The controller device 410 may retrieve configuration data of the detected edge devices 460 from the server 430 through the connection 415 or store a template or predefined configuration data. The controller device 410 may generate a user interface allowing a user to modify one or more operating parameters of the detected edge devices 460. The controller device 410 may forward the modified configuration data to the server 430 through the connection 415. When the edge devices 460 are enabled or powered-on, the edge device 460 may query the server 430 to request configuration data, and obtain the modified configuration data from the server 430 through respective connections 435 (e.g., wired, WLAN, cellular, or any other type of wired or wireless communication connection). Hence, the controller device 410 may pre-configure edge devices 460 even when the edge devices 460 are disabled or turned off, without waiting for each edge device 460 to be enabled or powered-on.

Figure 5:
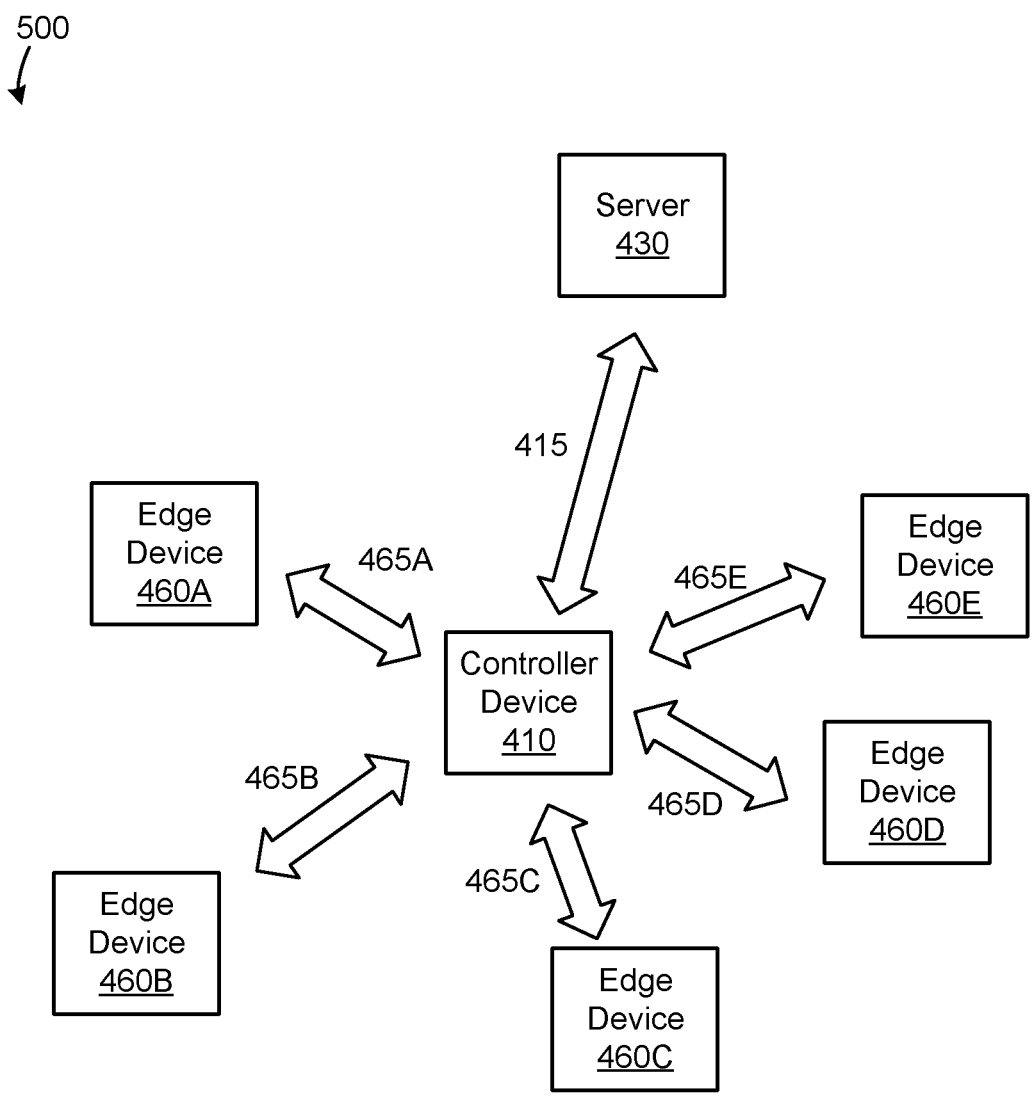
FIG. 5 is a block diagram of an HVAC system illustrating communication among different components of the HVAC system of FIG. 1, according to some embodiments.

FIG. 5 is a block diagram of an HVAC system 500 illustrating communication among different components of the HVAC system of FIG. 1, according to some embodiments. In some embodiments, the HVAC system 500 is implemented as the HVAC system 100 of FIG. 1. In FIG. 5, the components (e.g., server 430, edge devices 460, and controller device 410) are similar to the ones in FIG. 4, except the edge devices 460 obtain configuration data from the controller device 410 through respective connections 465 (e.g., Bluetooth, WLAN, or any other type of wired or wireless connections). Thus, duplicated description thereof is omitted herein for the sake of brevity. In one configuration, the controller device 410 enables configuring operating parameters of edge devices 460 without connections 435 to the server 430 through a simplified process. For example, the edge devices 460 are located away (e.g., in the basement) from the server 430 or from an access point, and may not communicate with the server 430.

In one approach, the controller device 410 detects or verifies edge devices 460 within a predetermined distance from the controller device 410. For example, the controller device 410 detects the edge devices 460 by decoding optical codes or through short range communications (e.g., near field communication, Bluetooth Low Energy communication, etc.) as described above with respect to FIG. 4. In response to detecting edge devices 460, the controller device 410 may generate or modify, for each detected edge device 460, corresponding configuration data and obtain corresponding network access information for establishing a wireless communication with the each detected edge device 460 through the connections 465 based on identifications of the detected edge devices 460. In one aspect, each edge device 460 provides a wireless network connection 465 accessible by corresponding network access information. For example, the controller device 410 may access a first wireless network connection 465A provided by the edge device 460A using first network access information, and access a second wireless network connection 465B provided by the edge device 460B using second network access information. In one aspect, the wireless network connection 465 allows a longer range and higher bandwidth communication than a wireless connection for short range communication to detect presence of the edge devices 460. The controller device 410 may simultaneously or sequentially establish different wireless communications with different edge devices 460 using network access information, and transmit configuration data to connected edge devices 460.

In some embodiments, the controller device 410 generates a user interface allowing a user to authenticate and generate a single instruction. In response to the single instruction, the controller device 410 may automatically connect to multiple edge devices 460 within the predetermined distance and transmit corresponding configuration data to different edge devices 460. Hence, the controller device 410 may configure multiple edge devices 460 within the predetermined distance through a seamless process.

In some embodiments, the controller device 410, the server 430, and the edge devices 460 operate as described above with respect to both FIGS. 4 and 5. For example, the configuration data and network information may be pushed to the server 430 from the controller device 410, and the server 430 may periodically attempt to connect to each of these edge devices 460 to push the configuration data to the edge devices 460.

Figure 6:
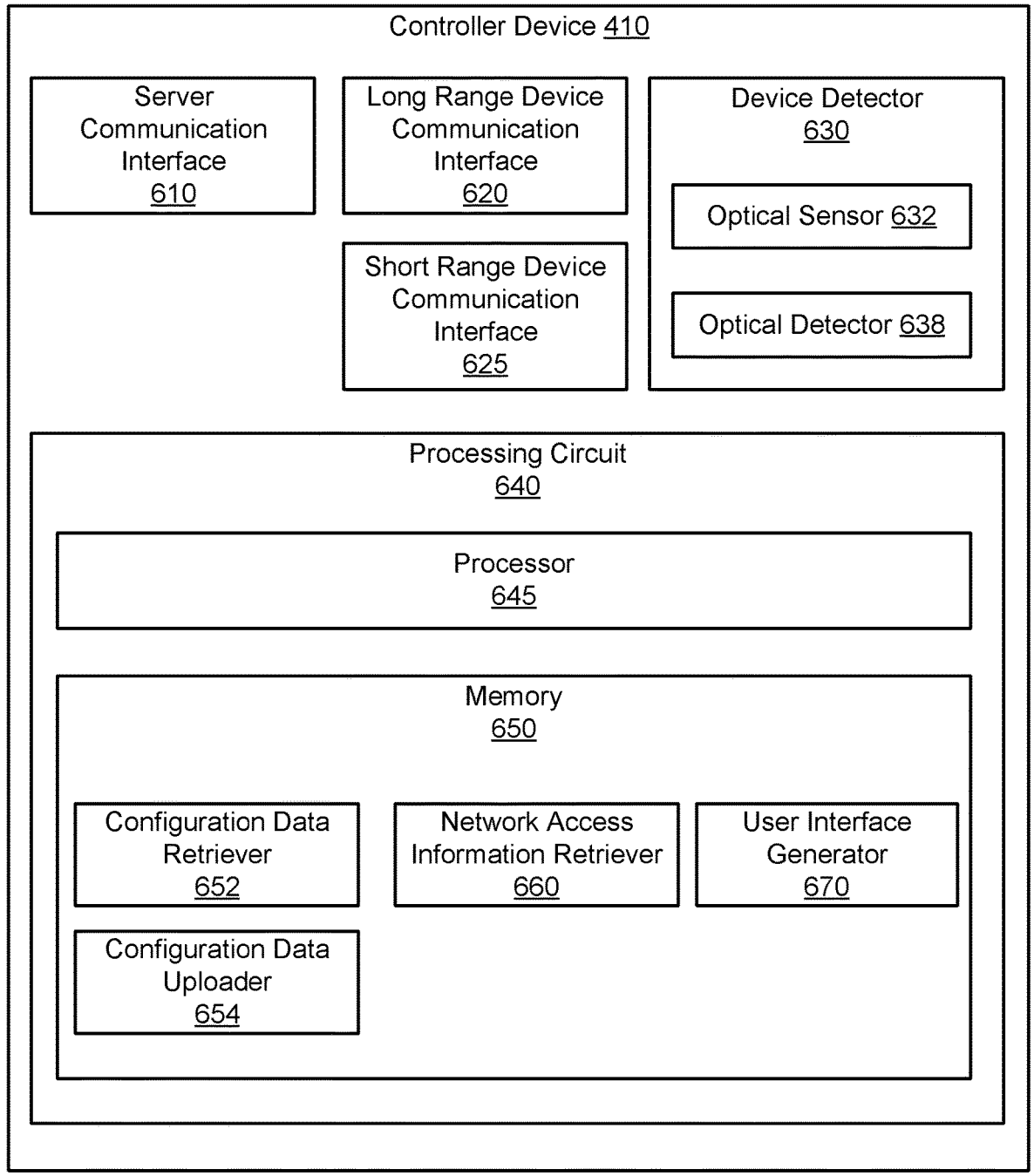
FIG. 6 is a block diagram of a controller device of FIG. 4 or FIG. 5, according to some embodiments.

FIG. 6 is a block diagram of a controller device 410 of FIG. 4 or FIG. 5, according to some embodiments. In one configuration, the controller device 410 includes a server communication interface 610, a long range device communication interface 620, a short range device communication interface 625, a device detector 630, and a processing circuit 640. These components operate together to detect edge devices 460 and configure the detected edge devices 460. In some embodiments, the controller device 410 includes additional, fewer, or different components than shown in FIG. 6.

The server communication interface 610 facilitates communication with the server 430. The server communication interface 610 can be or include wired or wireless communications interfaces (e.g., jacks, antennas, transmitters, receivers, transceivers, wire terminals, etc.). In various embodiments, communications via the server communication interface 610 can be direct (e.g., local wired or wireless communications) or via a communications network (e.g., a WAN, the Internet, a cellular network, etc.). For example, the server communication interface 610 can include an Ethernet/USB card and port for sending and receiving data through a network, for example, in TCP/IP protocol. In another example, the server communication interface 610 can include a Wi-Fi transceiver or a cellular transceiver for communicating via a wireless communications network, for example, in TCP/IP protocol. In another example, the server communication interface 610 can include cellular or mobile phone communication transceivers. Through the server communication interface 610, the controller device 410 may transmit a request for configuration data with identifications of edge devices 460 to the server 430. In return, through the server communication interface 610, the controller device 410 may receive configuration data and network access information of the edge devices 460. In addition, through the server communication interface 610, the controller device 410 may transmit modified configuration data to the server 430.

The long range device communication interface 620 facilitates communication with edge devices 460. The long range device communication interface 620 can be or include wireless communications interfaces (e.g., jacks, antennas, transmitters, receivers, transceivers, wire terminals, etc.). In various embodiments, communications via the long range device communication interface 620 can be direct (e.g., wireless communications). For example, the long range device communication interface 620 can include a Wi-Fi transceiver or a Bluetooth transceiver. In one approach, the long range device communication interface 620 accesses a network connection 465 hosted by the edge device 460 using network access information associated with the edge device 460. Through the long range device communication interface 620, the controller device 410 may transmit configuration data to the edge device 460.

The short range device communication interface 625 facilitates detection of an edge device 460. The short range device communication interface 625 can be or include wireless communications interfaces (e.g., jacks, antennas, transmitters, receivers, transceivers, wire terminals, etc.). In some embodiments, the short range device communication interface 625 is implemented as part of the device detector 630. In various embodiments, communications via the short range device communication interface 625 can be direct (e.g., wireless communications) with less communication range and bandwidth than communications via the long range device communication interface 620. For example, the short range device communication interface 625 can include a near field communication transceiver (or a Bluetooth Low Energy communication transceiver). In one approach, the short range device communication interface 625 detects an edge device 460, if a user places the controller device 410 near (e.g., within 5 inch) the edge device 460. Through the short range device communication interface 625, the controller device 410 may obtain, from the near edge device 460, identification data of the edge device 460. Identification data may indicate an identification of the edge device 460, and may additionally include network access information for accessing a network connection 465 hosted by the edge device 460.

The device detector 630 is a component that detects an edge device 460 and obtains an identification of the detected edge device 460 based on identification data. In some embodiments, the device detector 630 obtains identification data of the detected edge device 460 from the short range device communication interface 625, and obtains identification of the edge device 460 from the identification data. The device detector 630 may store a list of identifications of edge devices 460.

In some embodiments, the device detector 630 includes an optical sensor 632 (e.g., image sensor or camera) and an optical code detector 638 that operate together to detect an edge device 460 based on an optical code (e.g., a QR code, a bar code, a serial number, etc.) labeled on the edge device 460. The optical sensor 632 may capture an image to obtain image data. In one approach, a user (e.g., field engineer) operating the controller device 410 orients the controller device 410 to capture an image of an optical code on the edge device 460. The optical code may encode identification data indicating an identification of the edge device 460. The optical code detector 638 obtains the image data from the optical sensor 632, and decodes the optical code in the obtained image to extract the identification data.

The processing circuit 640 is a hardware circuit that facilitates retrieving, modifying, and loading configuration data. In one embodiment, the processing circuit 640 includes a processor 645, and memory 650 storing instructions (or program code) executable by the processor 645. In one embodiment, the instructions executed by the processor 645 form software modules including a configuration data retriever 652, a configuration data uploader 654, a network access information retriever 660, and a user interface generator 670. In other embodiments, the processor 645, and the memory 650 may be omitted, and these modules may be implemented as hardware modules by a reconfigurable circuit (e.g., field programmable gate array (FPGA)), an application specific integrated circuit (ASIC), or any circuitries, or a combination of software modules and hardware modules. In some embodiments, some operations performed by the server communication interface 610, the long range device communication interface 620, the short range device communication interface 625, and the device detector 630 are performed by the processing circuit 640. In some embodiments, some operations performed by the processing circuit 640 are performed by other components of the controller device 410.

The configuration data retriever 652 is a component that obtains configuration data indicating one or more operating parameters of an edge device 460 based on an identification of the edge device 460. In one approach, the configuration data retriever 652 transmits a request for configuration data for one or more edge devices 460 through the server communication interface 610. In response to the request, the configuration data retriever 652 receives, through the server communication interface 610, requested configuration data and stores the received configuration data at a local storage (e.g., memory 650). The configuration data stored may be indexed by corresponding identifications of edge devices 460. The configuration data retriever 652 may receive the configuration data before initiating, during, or after detection of the edge devices 460.

The configuration data uploader 654 is a component that uploads configuration data. In one approach, the configuration data uploader 654 transmits configuration data for one or more edge devices 460 to the server 430 through the server communication interface 610. In another approach, the configuration data uploader 654 transmits, for each of one or more edge devices 460, corresponding configuration data through the long device communication interface 620. The configuration data uploader 654 may transmit the configuration data periodically, in response to detecting a modification on the configuration data, or in response to an instruction from a user interface.

The network access information retriever 660 is a component that retrieves network access information for accessing wireless network connections 465 hosted by the edge devices 460. In one approach, the network access information retriever 660 obtains network access information embedded in identification data for an edge device 460. In this approach, the network access information retriever 660 obtains identification data from the device detector 630 or from the short range device communication interface 625, and extracts network access information from the identification data. In another approach, the network access information retriever 660 transmits a request for network access information for accessing a wireless network connection 465 hosted by an edge device 460 to the server 430 through the server communication interface 610. In response to the request, the network access information retriever 660 receives, through the server communication interface 610, the requested network access information and stores the received network access information at a local storage (e.g., memory 650). The network access information may be indexed by corresponding identifications of edge devices 460. The network access information retriever 660 may receive network access information before initiating, during, or after detection of the edge devices 460.

The user interface generator 670 is a component that generates a user interface allowing a user (e.g., field engineer) to generate and execute various instructions for operating the controller device 410 disclosed herein. In one aspect, the user interface generator 670 generates a user interface that allows a user to authenticate retrieving configuration data, modifying configuration data, and uploading modified configuration data. In one example, a unique key associated with the edge device is entered through the user interface, and the unique key is verified, for example, by the controller device 410 or the server 430. In another example, a specific account (e.g. individual user, company, etc.) is entered through the user interface, and the account is verified by the controller device 410 or the server 430. According to the verification of the unique key or the account, certain roles and privileges to retrieve, modify, and upload configuration data can be granted. In one aspect, the user interface generator 670 generates a user interface that presents a list of detected edge devices 460 and operating parameters of the detected edge devices 460. The user interface may allow a user to select edge devices 460 from the list of edge devices 460, and to modify operating parameters of the selected edge devices 460. Moreover, the user interface may generate a button that generates a single instruction to automatically upload modified configuration data. In one aspect, the single instruction allows modified configuration data of selected edge devices 460 to be uploaded through the configuration data uploader 654. For example, the single instruction allows configuration data of edge devices 460 to be uploaded to the server 430 through the server communication interface 610. For another example, the single instruction allows, for each of nearby edge devices 460, corresponding configuration data to be simultaneously or sequentially uploaded through the long range device communication interface 620. Hence, modifying operating parameters of edge devices 460, and uploading configuration data indicating the modified operating parameters can be performed in a seamless manner.

Figure 7:
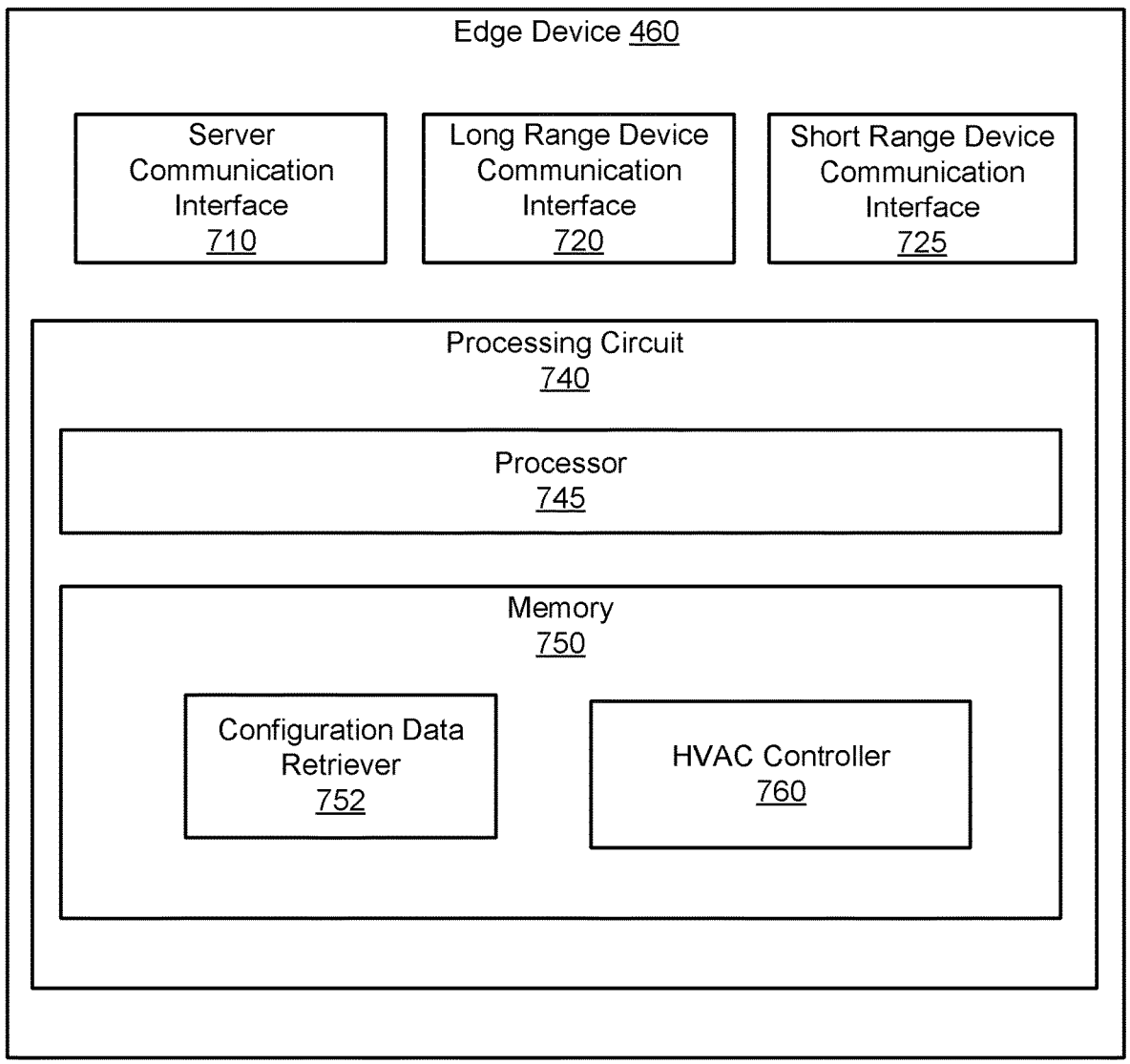
FIG. 7 is a block diagram of an edge device of FIG. 4 or FIG. 5, according to some embodiments.

FIG. 7 is a block diagram of an edge device 460 of FIG. 4 or FIG. 5, according to some embodiments. In one configuration, the edge device 460 includes a server communication interface 710, a long range device communication interface 720, a short range device communication interface 725, and a processing circuit 740. These components operate together to receive configuration data and operate according to one or more operating parameters specified by the configuration data to perform climate control. In some embodiments, the edge device 460 includes additional, fewer, or different components than shown in FIG. 7.

The server communication interface 710 facilitates communication with the server 430. The server communication interface 710 can be or include wired or wireless communications interfaces (e.g., jacks, antennas, transmitters, receivers, transceivers, wire terminals, etc.). In various embodiments, communications via the server communication interface 710 can be direct (e.g., local wired or wireless communications) or via a communications network (e.g., a WAN, the Internet, a cellular network, etc.). For example, the server communication interface 710 can include an Ethernet/USB card and port for sending and receiving data through a network, for example, in TCP/IP protocol. In another example, the server communication interface 710 can include a Wi-Fi transceiver or a cellular transceiver for communicating via a wireless communications network, for example, in TCP/IP protocol. In another example, the server communication interface 710 can include cellular or mobile phone communication transceivers. Through the server communication interface 710, the edge device 460 may transmit a request for configuration data with an identification of the edge device 460 to the server 430. Moreover, through the server communication interface 710, the edge device 460 may receive configuration data.

The long range device communication interface 720 facilitates communication with a controller device 410. The long range device communication interface 720 can be or include wireless communications interfaces (e.g., jacks, antennas, transmitters, receivers, transceivers, wire terminals, etc.). In various embodiments, communications via the long range device communication interface 720 can be direct (e.g., wireless communications). For example, the long range device communication interface 720 can include a Wi-Fi transceiver or a Bluetooth transceiver. In one approach, the long range device communication interface 720 provides or hosts a network connection 465 accessible by network connection information (e.g., SSID, passphrase, etc.). In one aspect, the long range device communication interface 720 establishes a direct point to point network connection 465 with the controller device 410. Through the long range device communication interface 720, the edge device 460 may receive configuration data from the controller device 410.

The short range device communication interface 725 facilitates detection of the edge device 460. The short range device communication interface 725 can be or include wireless communications interfaces (e.g., jacks, antennas, transmitters, receivers, transceivers, wire terminals, etc.). In various embodiments, communications via the short range device communication interface 725 can be direct (e.g., wireless communications) with less communication range and bandwidth than communications via the long range device communication interface 720. For example, the short range device communication interface 725 can include a near field communication transceiver. In one approach, if a user places the controller device 410 near (e.g., within 5 inch) the edge device 460, the short range device communication interface 725 transmits identification data of the edge device 460. Identification data may indicate an identification of the edge device 460 and may additionally include network access information for accessing a network connection 465 hosted by the edge device 460.

The processing circuit 740 is a hardware circuit that facilitates obtaining configuration data, and operating according to one or more operating parameters specified by the configuration data. In one embodiment, the processing circuit 740 includes a processor 745, and memory 750 storing instructions (or program code) executable by the processor 745. In one embodiment, the instructions executed by the processor 745 form software modules including a configuration data retriever 752 and HVAC controller 760. In other embodiments, the processor 745, and the memory 750 may be omitted, and these modules may be implemented as hardware modules by a reconfigurable circuit (e.g., field programmable gate array (FPGA)), an application specific integrated circuit (ASIC), or any circuitries, or a combination of software modules and hardware modules. In some embodiments, some operations performed by the server communication interface 710, the long range device communication interface 720, and the short range device communication interface 725 are performed by the processing circuit 740. In some embodiments, some operations performed by the processing circuit 740 are performed by other components of the server 430.

The configuration data retriever 752 is a component that obtains configuration data indicating one or more operating parameters of the edge device 460. In one approach, the configuration data retriever 752 actively queries the server 430 to obtain configuration data through the server communication interface 710 periodically or in response to being powered-on from a power off state. In response to the query, the configuration data retriever 752 may obtain the configuration data through the server communication interface 710. In another approach, the configuration data retriever 752 passively waits for configuration data to be uploaded. When the controller device 410 transmits configuration data through a connection 465 or the server 430 transmits configuration data through a connection 435, the configuration data retriever 752 receives the configuration data. The configuration data retriever 752 stores the received configuration data at a local storage (e.g., memory 750).

The HVAC controller 760 is a component that operates according to one or more operating parameters specified by the configuration data to perform climate control. For example, configuration data of a chiller specifies a target capacity, inlet flow rate, outlet flow rate, inlet temperature, and outlet temperature of a chiller, and the HVAC controller 760 operates according to the values specified by the configuration data. In some embodiments, the HVAC controller 760 obtains measurements of sensor values (e.g., measured temperature, pressure, flow rate, etc.) and transmits the measurements to the server 430 through the server communication interface 710.

Figure 8:
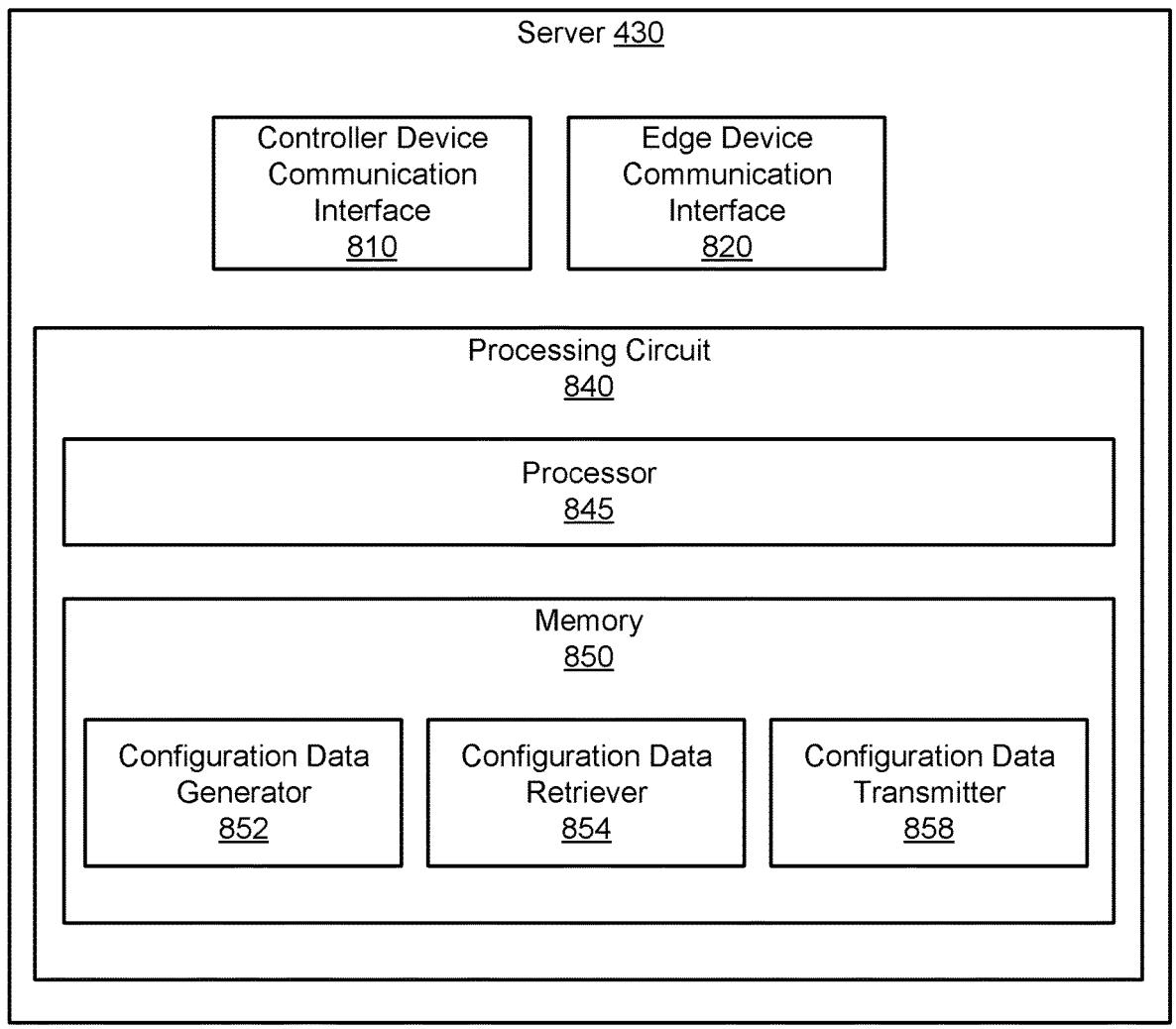
FIG. 8 is a block diagram of a server of FIG. 4 or FIG. 5, according to some embodiments.

FIG. 8 is a block diagram of a server 430 of FIG. 4 or FIG. 5, according to some embodiments. In one configuration, the server 430 includes a controller device communication interface 810, an edge device communication interface 820, and a processing circuit 840. These components operate together to generate and transmit configuration data to perform climate control. In some embodiments, the server 430 includes additional, fewer, or different components than shown in FIG. 8. For example, the server 430 may include an HVAC controller 760 of FIG. 7.

The controller device communication interface 810 facilitates communication with the controller device 410. The controller device communication interface 810 can be or include wired or wireless communications interfaces (e.g., jacks, antennas, transmitters, receivers, transceivers, wire terminals, etc.). In various embodiments, communications via the controller device communication interface 810 can be direct (e.g., local wired or wireless communications) or via a communications network (e.g., a WAN, the Internet, a cellular network, etc.). For example, the controller device communication interface 810 can include an Ethernet/USB card and port for sending and receiving data through a network, for example, in TCP/IP protocol. In another example, the controller device communication interface 810 can include a Wi-Fi transceiver or a cellular transceiver for communicating via a wireless communications network, for example, in TCP/IP protocol. In another example, the controller device communication interface 810 can include cellular or mobile phone communication transceivers. Through the controller device communication interface 810, the server 430 may receive a request for configuration data with an identification of the edge device 460 from the controller device 410. Moreover, the server 430 may transmit, through the controller device communication interface 810, configuration data. In some embodiments, the server 430 may receive a request for network access information with an identification of the edge device 460 from the controller device 410 through the controller device communication interface 810. In response to the request, the server 430 may transmit, to the controller device 410 through the controller device communication interface 810, the network access information to access a network hosted by an edge device 460 associated with the identification.

The edge device communication interface 820 facilitates communication with edge devices 460. The edge device communication interface 820 can be or include wired or wireless communications interfaces (e.g., jacks, antennas, transmitters, receivers, transceivers, wire terminals, etc.). In various embodiments, communications via the edge device communication interface 820 can be direct (e.g., local wired or wireless communications) or via a communications network (e.g., a WAN, the Internet, a cellular network, etc.). For example, the edge device communication interface 820 can include an Ethernet/USB card and port for sending and receiving data through a network, for example, in TCP/IP protocol. In another example, the edge device communication interface 820 can include a Wi-Fi transceiver or a cellular transceiver for communicating via a wireless communications network, for example, in TCP/IP protocol. Through the edge device communication interface 820, the server 430 may, from an edge device 460, receive a request for configuration data with an identification of the edge device 460. Moreover, the server 430 may transmit, through the edge device communication interface 820, configuration data of the edge device 460.

The processing circuit 840 is a hardware circuit that generates configuration data and facilitates communication of other devices (e.g., controller device 410 and edge devices 460 of FIGS. 4 and 5). In one embodiment, the processing circuit 840 includes a processor 845, and memory 850 storing instructions (or program code) executable by the processor 845. In one embodiment, the instructions executed by the processor 845 form software modules including a configuration data generator 852, a configuration data retriever 854, and configuration data transmitter 858. In other embodiments, the processor 845, and the memory 850 may be omitted, and these modules may be implemented as hardware modules by a reconfigurable circuit (e.g., field programmable gate array (FPGA)), an application specific integrated circuit (ASIC), or any circuitries, or a combination of software modules and hardware modules. In some embodiments, some operations performed by the controller device communication interface 810 and the edge device communication interface 820 are performed by the processing circuit 840. In some embodiments, some operations performed by the processing circuit 840 are performed by other components of the server 430.

The configuration data generator 852 is a component that generates configuration data. In some embodiments, the configuration data generator 852 receives default values of operating parameters for different edge devices 460 and stores the default values of the operating parameters at the memory 850. In some embodiments, the configuration data generator 852 receives target set points and determines operating parameters of the edge devices 460 that render the minimal energy consumption or the minimal operating cost. The configuration data generator 852 may receive measurement values of sensors from edge devices 460 through edge device communication interface 820, and determine updated or modified operating parameters of edge devices 460 to achieve the set points. The configuration data generator 852 may generate the configuration data indicating determined operating parameters of the edge devices 460 and store the configuration data. In one approach, the configuration data is indexed by corresponding identifications of edge devices 460.

The configuration data retriever 854 is a component that receives configuration data. In some embodiments, the configuration data retriever 854 receives configuration data or modified configuration data of edge devices 460 from the controller device 410 through the controller device communication interface 810. In one aspect, the configuration data is identified by corresponding identifications of the edge devices 460. The configuration data retriever 854 may store the received configuration data at the memory 850.

The configuration data transmitter 858 is a component that transmits configuration data. In some embodiments, the configuration data transmitter 858 receives, from an edge device 460, a request for configuration data of the edge device 460 along with an identification of the edge device 460, and transmits the requested configuration data to the edge device 460 identified by the received identification through the edge device communication interface 820. Similarly, in some embodiments, the configuration data transmitter 858 receives, from the controller device 410, a request for configuration data of an edge device 460 along with an identification of the edge device 460. In response to the request, the configuration data transmitter 858 may transmit the requested configuration data to the controller device 410 identified by the received identification through the controller device communication interface 810.

Figure 9:
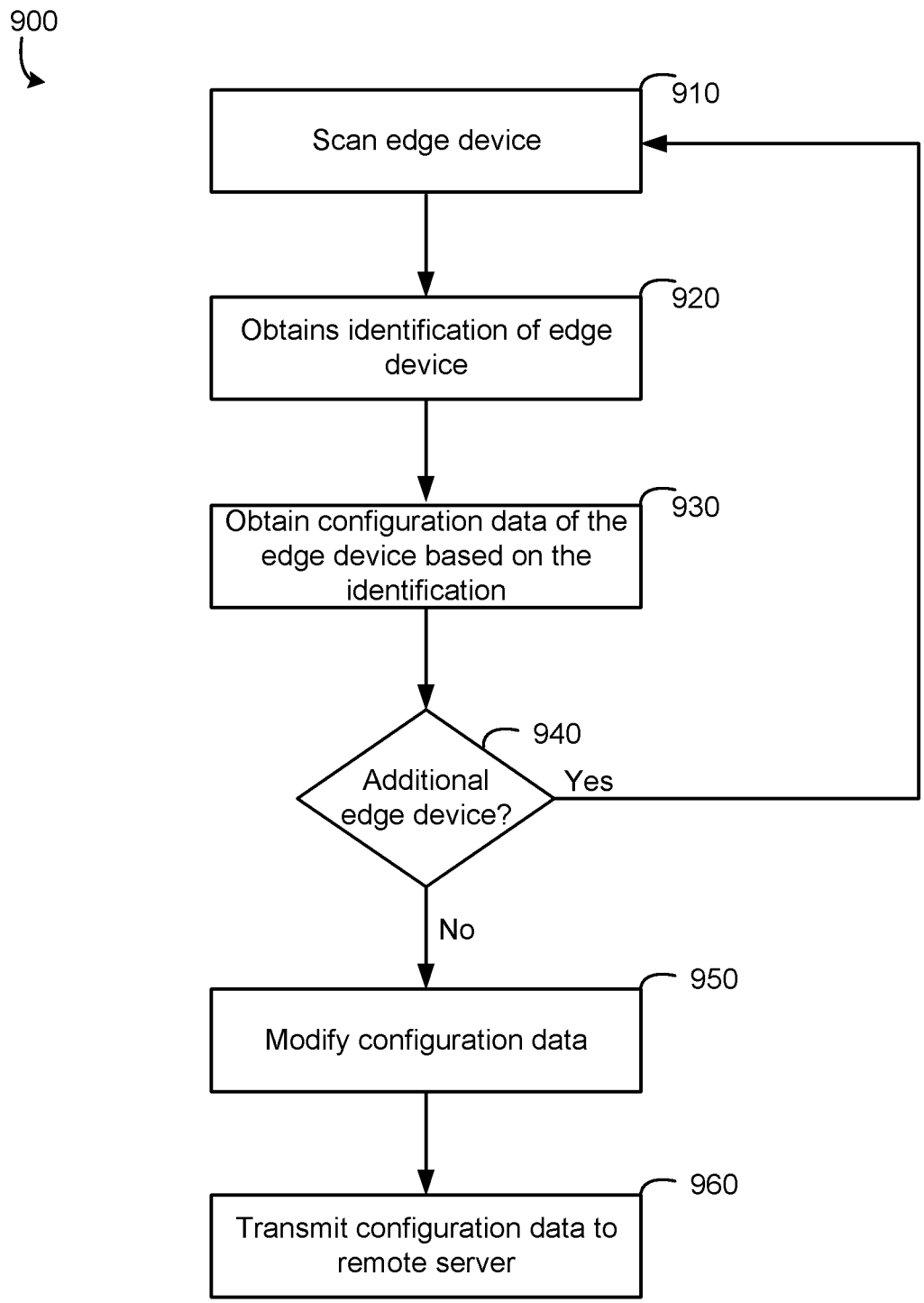
FIG. 9 is a flow chart illustrating a process of configuring edge devices, according to some embodiments.

FIG. 9 is a flow chart illustrating a process 900 of configuring edge devices 460, according to some embodiments. The process 900 may be performed by the controller device 410 of FIG. 4. In one aspect, the process 900 is performed when edge devices 460 are disabled or powered-off. The edge devices 460 may communicate with the server 430 through respective connections 435. In some embodiments, the process 900 may be performed by other entities. In some embodiments, the process 900 may include additional, fewer, or different steps than shown in FIG. 9.

In some embodiments, the controller device 410 scans or detects a nearby edge device 460 (step 910), and obtains an identification of the detected edge device 460 (step 920). The edge device 460 may be disabled or powered-off. In some embodiments, the controller device 410 detects an edge device 460 and obtains the identification of edge device 460 through an optical code or through a secondary communication link (e.g., near field communication link, Bluetooth Low Energy communication link, etc.).

In one approach, a user (e.g., field engineer) operating the controller device 410 captures an image of an optical code (e.g., a QR code, a bar code, a serial number, etc.) on the edge device 460 to obtain image data. The optical code may be labeled on an exterior of the edge device 460. In one aspect, the optical code encodes identification data indicating an identification of the edge device 460. The controller device 410 may decode the image data to obtain the identification of the edge device 460.

In one approach, a user (e.g., field engineer) operating the controller device 410 places the controller device 410 near (e.g., within 5 inch) the edge device 460 to obtain identification data of the edge device 460. In one aspect, the controller device 410 detects the edge device 460 through a secondary communication link (e.g., near field communication link, Bluetooth Low Energy communication link, etc.), if the edge device 460 is within a detectable range. When the controller device 410 and the edge device 460 are within the detectable range, the edge device 460 transmits identification data indicating an identification of the edge device 460 to the controller device 410.

The controller device 410 obtains configuration data of the edge device 460 based on the identification (step 930). In one approach, the controller device 410 stores, for each of a plurality of edge devices 460, corresponding configuration data at a local storage of the controller device 410, prior to scanning or detecting the edge device 460. The configuration data may be indexed by corresponding identifications of edge devices 460. The controller device 410 may identify, from the stored configuration data at the local storage, configuration data of the edge device 460 according to the obtained identification of the edge device 460. In another approach, the controller device 410 does not store configuration data prior to scanning or detecting the edge device 460. The controller device 410 may transmit, to the server 430, a request for configuration data of the detected edge device 460 along with an identification of the edge device 460. In response to the request, the controller device 410 may receive, from the server 430, configuration data of the edge device 460.

The controller device 410 determines whether an additional edge device 460 without configuration data exists or not (step 940). If an additional edge device 460 without corresponding configuration data exists, the controller device 410 returns to step 910 to obtain configuration data of the additional edge device 460.

Although in FIG. 9, obtaining configuration data in step 930 is performed prior to determining whether an additional edge device 460 exits or not in step 940, in some embodiments, configuration data of multiple edge devices 460 may be obtained after detecting and obtaining identifications of nearby edge devices 460. For example, a user interface may present a list of all edge devices 460 detected, and allow a user to select some or all of edge devices 460. The user interface may also detect a button click or a swipe to authenticate and retrieve configuration data of selected edge devices 460. Retrieving configuration data of selected edge devices through a single communication with the server 430 rather than through multiple communications enables savings of communication bandwidth and power consumption of the control device 410.

The controller device 410 modifies configuration data (step 950). The controller device 410 may generate a user interface allowing a user (e.g., field engineer) to modify or confirm operating parameters of detected edge devices 460. The controller device 410 may present a list of detected edge devices 460 with corresponding configuration data.

The controller device 410 transmits the modified or verified configuration data of edge devices 460 to the server 430 with corresponding identifications of the edge devices 460 (step 960). In one approach, the server 430 forwards the received configuration data to respective edge devices 460. When the edge devices 460 are enabled or powered-on, the edge devices 460 may query the server 430 for configuration data. In response to the requests from the edge devices 460, the server device 430 may transmit, to each requesting edge device 460, corresponding configuration data.

Figure 10:
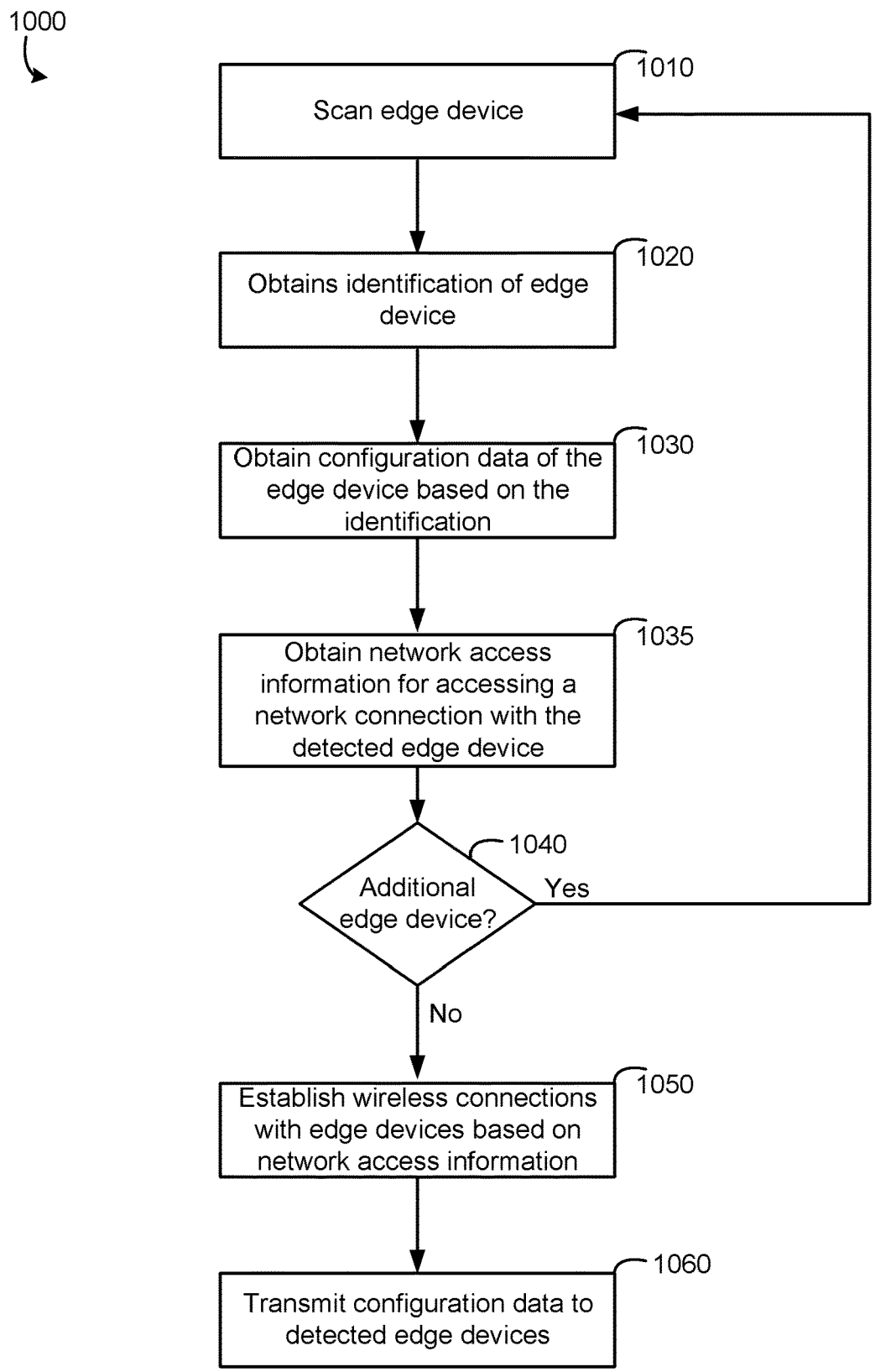
FIG. 10 is a flow chart illustrating a process of configuring edge devices, according to some embodiments.

FIG. 10 is a flow chart illustrating a process 1000 of configuring edge devices 460, according to some embodiments. The process 1000 may be performed by the controller device 410 of FIG. 5. In one aspect, the process 1000 is performed when edge devices 460 are enabled or powered-on, but do not have network connections 435 to the server 430. In some embodiments, the process 1000 may be performed by other entities. In some embodiments, the process 1000 may include additional, fewer, or different steps than shown in FIG. 10. Steps 1010, 1020, 1030 of the process 1000 are similar to the steps 910, 920, 930 of the process 900 of FIG. 9, thus detailed description of duplicated portion is omitted herein.

In some embodiments, after detecting or scanning an edge device in step 1010, the controller device 410 obtains network access information for accessing a network connection 465 with the detected edge device 460 (step 1035). In one approach, identification data includes network access information in addition to identification of an edge device 460. Thus, the controller device 410 may obtain network access information by decoding an optical code of an edge device 460 to obtain identification data, or by receiving identification data through a near field communication link or Bluetooth Low Energy communication link. In another approach, the controller device 410 transmits a request for the network access information with an identification of an edge device 460. In response, the server 430 provides the requested network access information for accessing a network connection 465 hosted by the edge device 460 associated with the identification.

The controller device 410 determines whether an additional edge device 460 without network access information exists or not (step 1040). If an additional edge device 460 without corresponding network access information exists, the controller device 410 returns to step 1010 to obtain network access information of the additional edge device 460.

Although in FIG. 10, obtaining network access information in step 1035 is performed prior to determining whether an additional edge device 460 exits or not in step 1040, in some embodiments, network access information of multiple edge devices 460 may be obtained after detecting and obtaining identifications of nearby edge devices 460. For example, a user interface may present a list of all edge devices 460 detected, and allow a user to select some or all of edge devices 460. The user interface may also detect a button click or a swipe to authenticate and retrieve network access information of selected edge devices 460. In one approach, the controller device 410 retrieves configuration data and network access information of the selected edge devices 460 from the server 430 according to a single instruction. By eschewing multiple communications with the server 430 to obtain configuration data and network access information separately, further reduction of communication bandwidth and power consumption of the control device 410 can be achieved.

In some embodiments, the controller device 410 establishes wireless connections with selected edge devices 460 based on network access information (step 1050), and transmits configuration data to the edge devices 460. The controller device 410 may simultaneously or sequentially access different wireless communications 465 with different edge devices 460 using network access information, and transmit configuration data to connected edge devices 460. In one example, a user interface may present a list of edge devices 460 with network access information obtained, and allow a user to select some or all of edge devices 460. The user interface may also present a button that generates a single instruction to authenticate, establish communications with the selected edge devices 460 sequentially or in parallel, and transmit or upload configuration data to the selected edge devices 460. In one approach, the user interface detects a button click or a swipe that generates a single instruction in response to the detection i) to automatically obtain configuration data and network access information of selected edge devices 460, ii) to connect to the selected edge devices 460 using network access information, and iii) to transmit configuration data to the selected edge device 460. Accordingly, edge devices 460 without network connections 435 to the server 430 can be configured and operate according to configuration data through a seamless process.

FIGS. 11A through 11E are example user interfaces 1100A through 1100E presented on a controller device 410 for configuring edge devices 460, according to some embodiments. In some embodiments, the user interfaces 1100A through 1100E are presented for accessing network connections 465 hosted by the edge devices 460 based on optical codes of the edge devices 460.

Figure 11B:
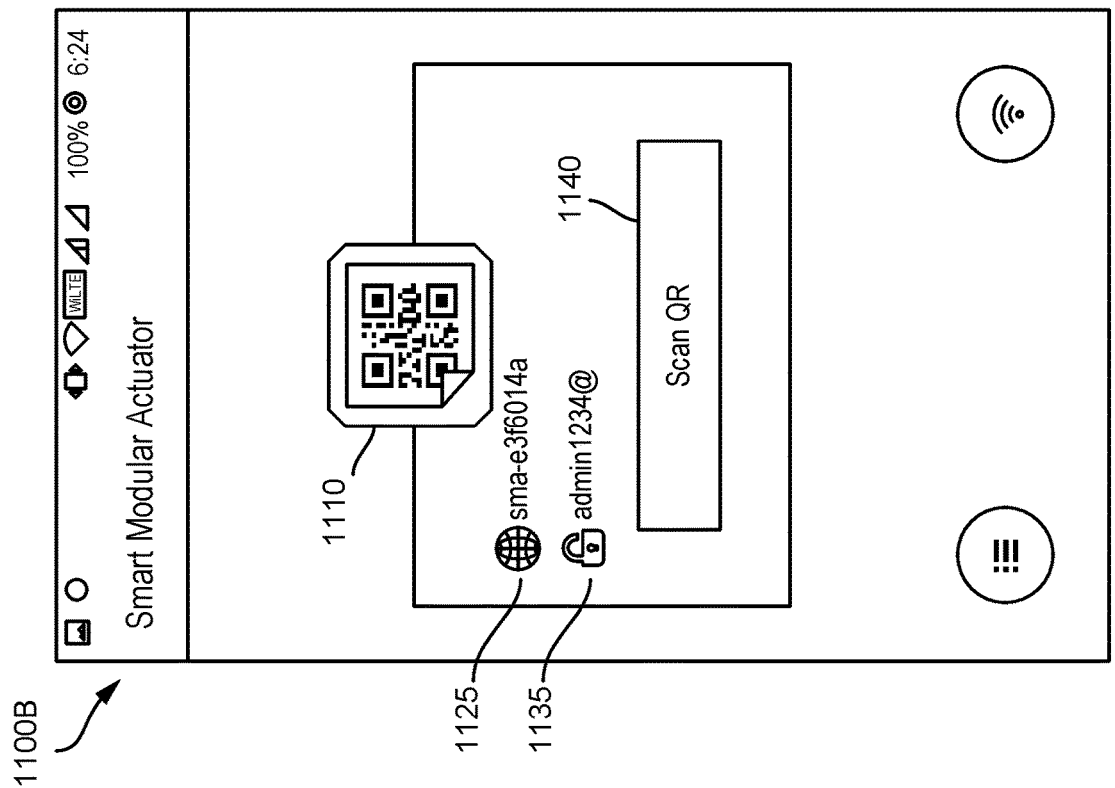
FIGS. 11A through 11E are example user interfaces presented on a controller device for configuring edge devices, according to some embodiments.
Figure 11A:
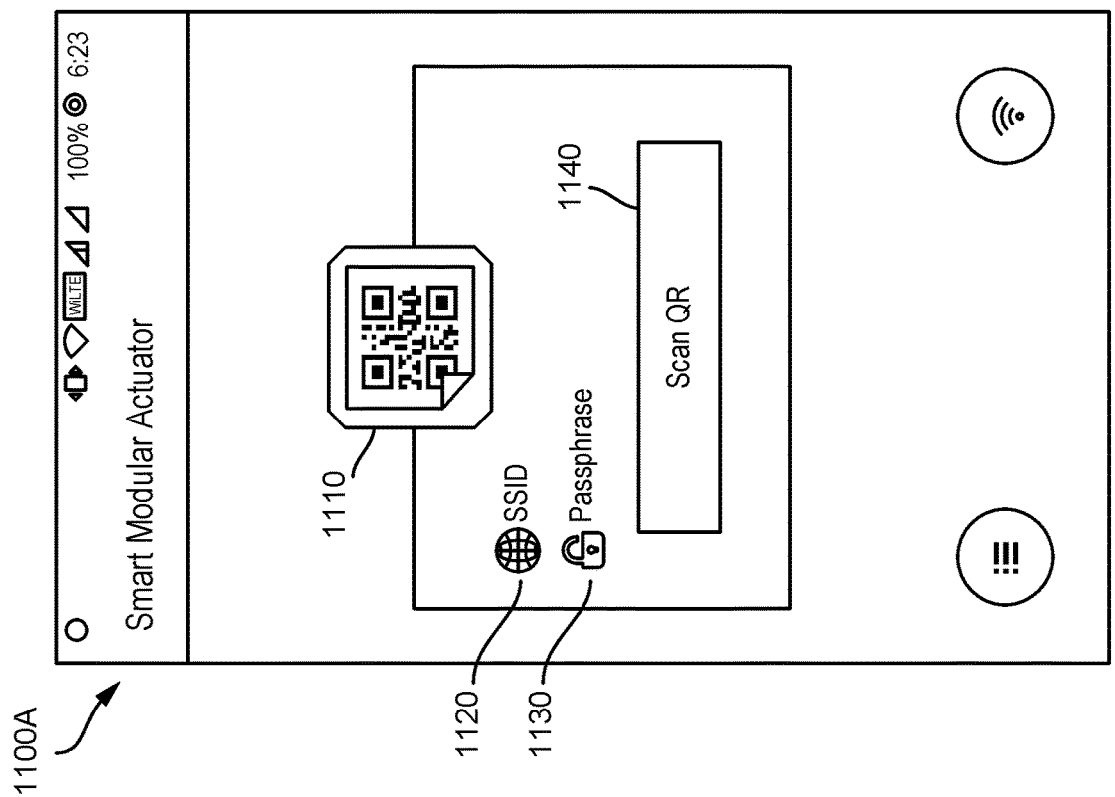

In some embodiments, a user operating the controller device 410 obtains an image of an optical code 1110 labeled on an edge device 460. In FIG. 11A, the user interface 1100A presents the optical code 1110, where network access information including network identification 1120 (e.g., SSID) and communication key 1130 (e.g., passphrase) are left blank. The user interface 1100A includes a button 1140 to initiate a decoding process of the optical code 1110. In response to a user clicking the button 1140, the controller device 410 decodes the optical code 1110 to obtain network access information including SSID 1125 and passphrase 1135, and the user interface 1100B presents the obtained SSID 1125 and passphrase 1135 as shown in FIG. 11B.

Figure 11C:
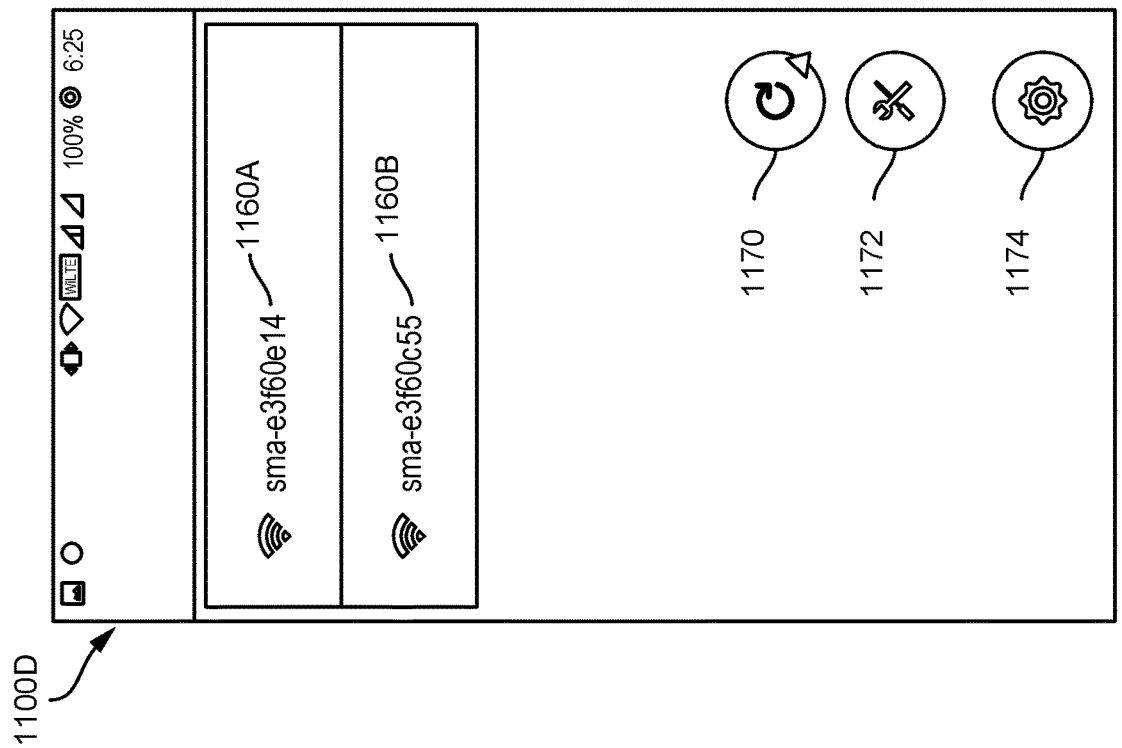
Figure 11D:
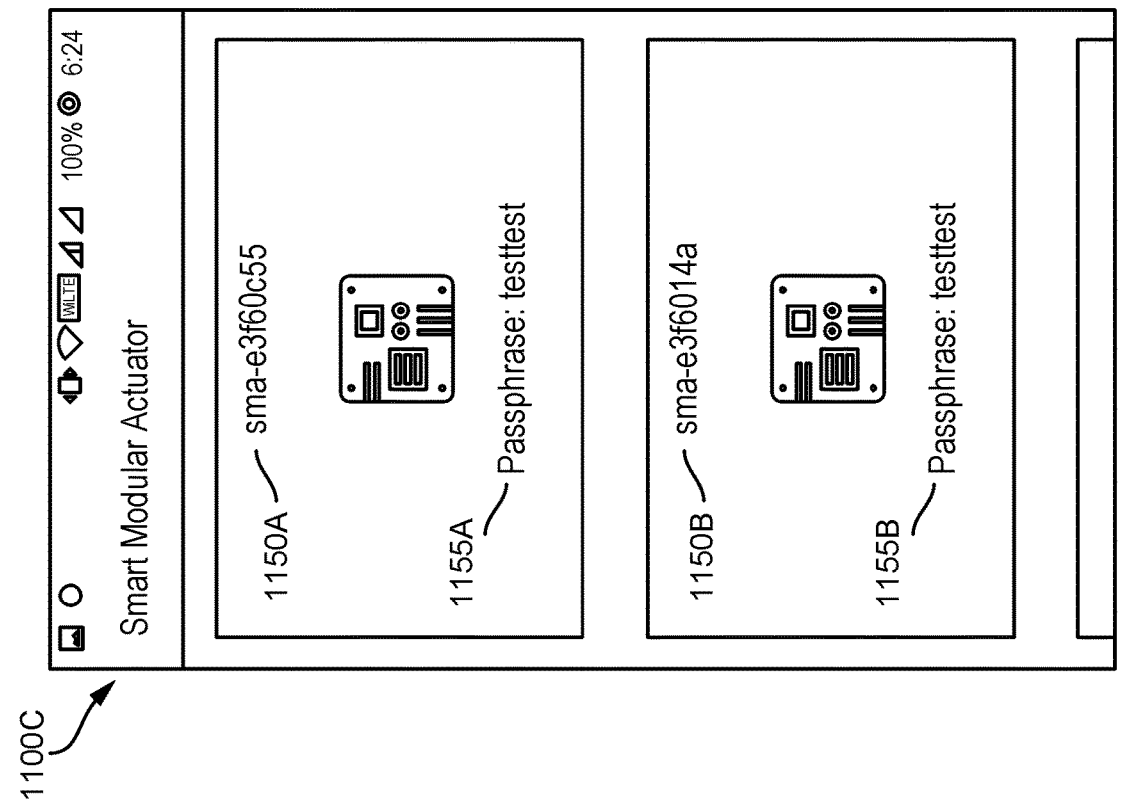

In FIG. 11C, the user interface 1100C presents a list of edge devices 460 detected with corresponding network access information (e.g., SSIDs 1150A, 1150B and passphrases 1155A, 1155B). In FIG. 11D, the user interface 1100D presents a list of SSIDs 1160A, 1160B of connected or connectable network connections 465. The user interface 1100D also presents a refresh button 1170 to refresh the list, a modification button 1172 to change network connection information or configuration data, and a setting button 1174 to configure presentation settings (e.g., color, font, etc.) of the list of SSIDs 1160A, 1160B.

Figure 11E:
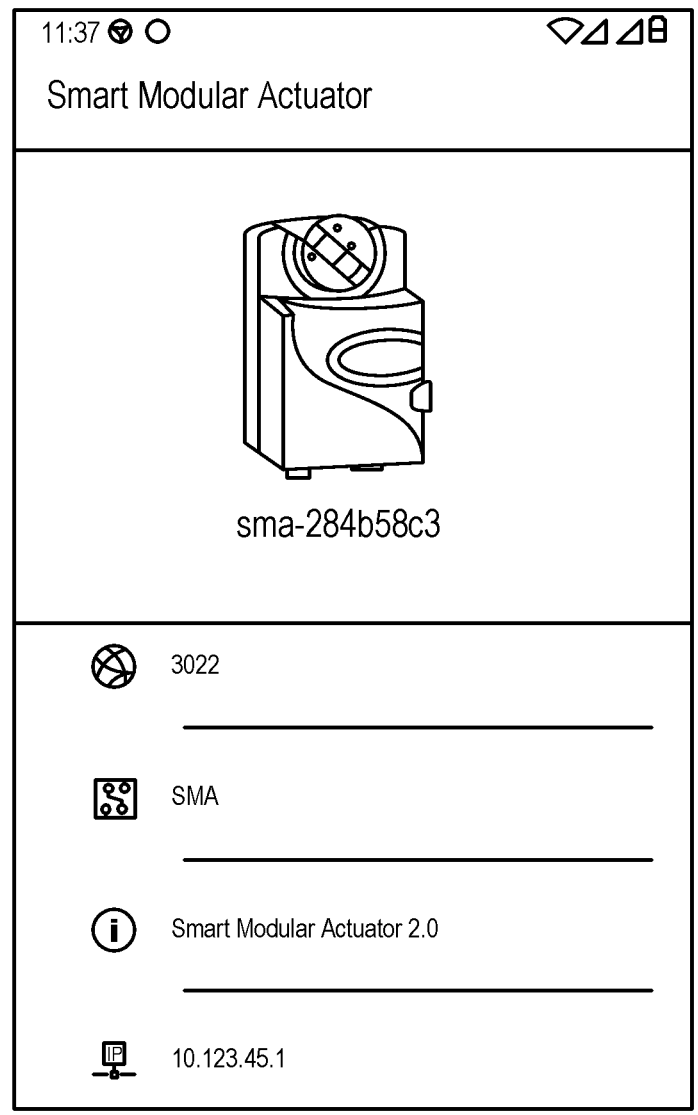

In FIG. 11E, the user interface 1100E presents operating parameters of a selected edge device 460. Through the user interface 1100E, a user may modify one or more operating parameters to update or modify the configuration data.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A controller device comprising:
    a device detector to detect one or more edge devices of a central plant;
    a server communication interface coupled to the device detector, the server communication interface to communicate with a remote server; and
    a processor coupled to the device detector and the server communication interface, the processor configured to:
        obtain a first identification of a first edge device detected by the device detector,
        generate first configuration data of the first edge device based on the first identification of the first edge device, the first configuration data indicating one or more first operating parameters of the first edge device for climate control of the central plant,
        transmit the first configuration data to the remote server through the server communication interface,
        obtain a second identification of a second edge device from the device detector,
        generate second configuration data of the second edge device based on the second identification of the second edge device, the second configuration data indicating one or more second operating parameters of the second edge device for the climate control of the central plant, and
        transmit the second configuration data of the second edge device to the remote server through the server communication interface,
    wherein the first edge device is configured to:
        retrieve the first configuration data of the first edge device from the remote server, and
        operate according to the one or more first operating parameters of the first configuration data for the climate control.

2. The controller device of claim 1, wherein the processor is configured to generate the first configuration data in response to determining that the first edge device is powered-off.

3. The controller device of claim 2, wherein the first edge device is configured to retrieve the first configuration data of the first edge device from the remote server, in response to the first edge device being powered-on from a powered-off state.

4. The controller device of claim 1, wherein the processor is configured to:
    obtain third identification of third edge device from the device detector, generate third configuration data of the third edge device based on the third identification of the third edge device, the third configuration data indicating one or more third operating parameters of the third edge device for the climate control of the central plant, and transmit the third configuration data of the third edge device to the remote server through the server communication interface.

5. The controller device of claim 1, wherein the processor is configured to:

transmit the first configuration data of the first edge device with the second configuration data of the second edge device to the remote server through the server communication interface.

6. The controller device of claim 1, wherein the processor is configured to:

generate a user interface allowing a user of the controller device to modify the one or more first or second operating parameters, and generate the first or second configuration data according to the modified first or second operating parameters.

7. The controller device of claim 6, wherein the processor is configured to:

authenticate the user of the controller device through the user interface, and allow the user to modify the first or second operating parameter in response to an authentication by the user.

8. The controller device of claim 1, wherein the device detector includes an optical code detector, the optical code detector to detect the first or second identification of the first or second edge device based on an image data including an optical code of the first or second edge device.

9. The controller device of claim 1, further comprising a device communication interface coupled to the processor, the device communication interface to detect the first identification of the first edge device based on a wireless communication with the first edge device through the device communication interface.

10. A controller device comprising:

a device detector to detect edge devices within a predetermined distance of a central plant;

a device communication interface coupled to the device detector, the device communication interface to communicate with the detected edge devices; and a processor coupled to the device detector and the device communication interface, the processor configured to:

obtain a first identification of a first edge device detected by the device detector, generate first configuration data of the first edge device based on the first identification of the first edge device, the first configuration data indicating one or more first operating parameters of the first edge device for climate control of the central plant, transmit the first configuration data to a remote server through a server communication interface, obtain a second identification of a second edge device from the device detector, generate second configuration data of the second edge device based on the second identification of the second edge device, the second configuration data indicating one or more second operating parameters of the second edge device for the climate control of the central plant, and transmit the second configuration data of the second edge device to the remote server through the server communication interface.

11. The controller device of claim 10, wherein the processor is further configured to generate a user interface allowing a user of the controller device to authenticate and generate a single instruction according to an authentication by the user, wherein the processor is configured to transmit, to each of the detected edge devices, corresponding configuration data, in response to the single instruction.

12. The controller device of claim 11, wherein the device communication interface is configured to sequentially connect to wireless networks provided by the detected edge devices, in response to the single instruction, wherein the processor is configured to transmit, to each of the detected edge devices, the corresponding configuration data, while the device communication interface is connected to a wireless network provided by the each of the detected edge devices.

13. The controller device of claim 11, wherein the device communication interface is configured to simultaneously connect to wireless networks provided by two or more of the detected edge devices, in response to the single instruction, wherein the processor is configured to simultaneously transmit, to each of the two or more of the detected edge devices, the corresponding configuration data, while the device communication interface is connected to the wireless networks provided by the two or more of the detected edge devices.

14. The controller device of claim 10, wherein the server communication interface coupled to the device detector, the server communication interface to communicate with the remote server; and a local storage coupled to the processor, wherein the processor is configured to:

obtain, for each of the edge devices, corresponding configuration data from the remote server through the server communication interface, and store, for each of the plurality of edge devices, the corresponding configuration data at the local storage prior to obtaining identifications of the detected edge devices.

15. The controller device of claim 14, wherein the processor is configured to obtain, for each of the detected edge devices, the corresponding configuration data from the local storage based on corresponding identification.

16. The controller device of claim 10, wherein the device detector includes an optical code detector, the optical code detector to detect identifications of the detected edge devices based on image data including optical codes of the detected edge devices.

17. The controller device of claim 10, wherein the device communication interface is configured to detect identifications of the detected edge devices based on secondary wireless connections with the detected edge devices through the device communication interface.

18. The controller device of claim 10, wherein a wireless network provided by an edge device is a direct point to point network between the controller device and the edge device.

19. A controller device for a central plant, comprising:

a device communication interface coupled to communicate with edge devices; and a processor coupled to the device communication interface, the processor configured to:

obtain a first identification of a first edge device detected via the device communication interface, generate first configuration data of the first edge device based on the first identification of the first edge device, the first configuration data indicating one or more first operating parameters of the first edge device for climate control of the central plant, transmit the first configuration data to a remote server through a server communication interface, obtain a second identification of a second edge device, generate second configuration data of the second edge device based on the second identification of the second edge device, the second configuration data indicating one or more second operating parameters of the second edge device for the climate control of the central plant, and transmit the second configuration data of the second edge device to the remote server through the server communication interface.

20. The controller device of claim 19, wherein the processor is configured to generate the first configuration data in response to determining that the first edge device is powered-off.

* * * * *